Patented Apr. 16, 1974

3,804,856
N-PHENYLSUCCINIMIDES
Shigehiro Ooba, Takarazuka, Toshiaki Ozaki, Sigeo Yamamoto, Toyonaka, and Katsutoshi Tanaka, Takarazuka, Japan, assignors to Sumitomo Chemical Company, Limited, Osaka, Japan.
No Drawing. Filed Aug. 31, 1971, Ser. No. 176,713
Claims priority, application Japan, Sept. 4, 1970, 45/78,084; Dec. 7, 1970, 45/108,732
Int. Cl. C07d 27/10
U.S. Cl. 260—326.44    9 Claims

ABSTRACT OF THE DISCLOSURE

A novel N-phenylsuccinimide derivative having the formula,

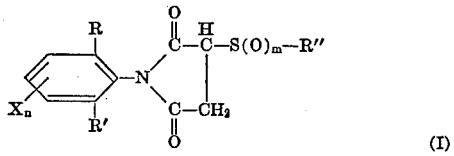

wherein R and R' are individually halogen or a lower alkyl; X is halogen, a lower alkyl, a lower alkoxy or nitro; R" is an alkyl having 1 to 10 carbon atoms, an alkenyl, a group of the formula,

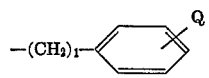

wherein Q is hydrogen, halogen a lower alkyl, a lower alkoxy or nitro, and $l$ is 1, 2, 3 or 4; a group of the formula,

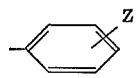

wherein Z is hydrogen, halogen, a lower alkyl, a lower alkoxy or nitro; α-furfuryl or a group of the formula, —CH$_2$COOR''' wherein R''' is a lower alkyl, $n$ is 0, 1, 2 or 3; and $m$ is 0, 1 or 2, exhibits an extremely strong microbicidal activity on a markedly wide scope of microorganisms and has a low toxicity. The above-mentioned compound can be prepared by the addition reaction of an N-phenylmaleimide derivative represented by the formula,

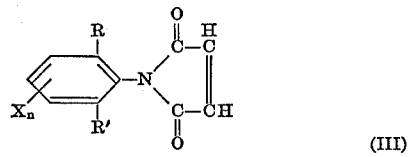

with a compound represented by the formula

R"SH    (IV)

or by the oxidation of a compound of the formula,

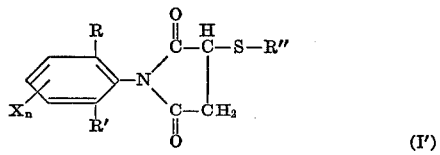

which is obtained by the above-mentioned reaction. Alternatively, the said novel N-phenylsuccinimide derivative can be prepared by dehydrating and ring-closing a compound of the formula,

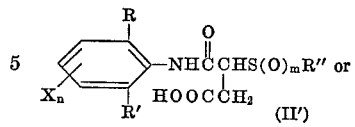

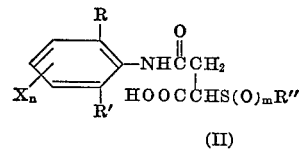

This invention relates to novel N-phenylsuccinimide derivatives, a process for the preparation thereof, and novel non-medical microbicidal compositions containing said compounds as an active ingredient.

Several N-phenylsuccinimide derivatives have been well known, but they have not been sufficiently strong in microbicidal activity.

An object of the present invention is to provide novel N-phenylsuccinimide derivatives.

Another object of the invention is to provide novel N-phenylsuccinimide derivatives which are not only strong in microbicidal activity but also low in toxicity.

A further object of the invention is to provide non-medical microbicidal compositions containing said novel N-phenylsuccinimide derivatives as an active ingredient.

A still further object of the invention is to provide a novel process for preparing the novel N-phenylsuccinimide derivatives.

Other objects and advantages of the invention will become apparent from the following description.

In accordance with the present invention, there are provided novel N-phenylsuccinimide derivatives represented by the formula,

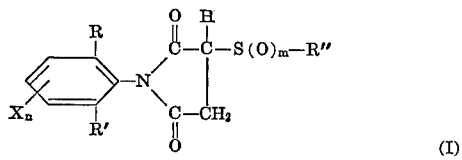

wherein R and R' are individually halogen or a lower alkyl; X is halogen, a lower alkyl, a lower alkoxy or nitro; R" is an alkyl having 1 to 10 carbon atoms, an alkenyl, a group of the formula,

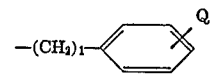

wherein Q is hydrogen, halogen, a lower alkyl, a lower alkoxy or nitro, and $l$ is 1, 2, 3 or 4, a group of the formula,

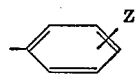

wherein Z is hydrogen, halogen, a lower alkyl, a lower alkoxy or nitro, α-furfuryl, or a group of the formula, —CH$_2$COOR''', wherein R''' is a lower alkyl; $n$ is 0, 1, 2 or 3; and $m$ is 0, 1 or 2.

The compounds of the present invention have strong microbicidal activities which have never been anticipated from the known homologous compounds and, moreover, are effective against an extremely wide scope of microorganisms. That is, in case halogen atoms or lower alkyl groups have simultaneously or individually been substituted particularly at the 2- and 6-positions of benzene rings of the N-phenylsuccinimide derivatives, physiological activities entirely different from those of other homologous compounds, i.e. strong microbicidal activities, are observed and, nevertheless, detrimental actions on plants are scarcely recognized.

The present compounds have prominent effects on such a wide scope of diseases as rice blast, rice helminthosporium leaf spot, rice bacterial leaf blight, and sclerotinia rot, brown rot, ripe rot, gray mold, cork spot, blossum blight, powdery mildew, alternaria leaf spot, damping off, bacterial canker, etc. of agricultural and horticultural crops. Further, they can control 2 or more diseases at the same time and hence are markedly excellent as plant disease-controlling chemicals. Moreover, the present compounds are effective against molds which propagate in industrial products, and hence are excellent also as industrial microbicides. The present compounds are extremely low in toxicity and have little detrimental actions on mammals and fishes. In addition, they are far greater than dicyandiamides in effect of controlling the nitration of ammonia nitrogen in the soil.

The present invention further provides nonmedical microbicidal compositions containing as an active ingredient the novel N-phenylsuccinimide derivatives represented by the Formula I.

The novel N-phenylsuccinimide derivatives of the Formula I are prepared according to any of the following processes:

Process (1): An N-phenylsuccinic acid monoamide derivative represented by the Formula II or II'.

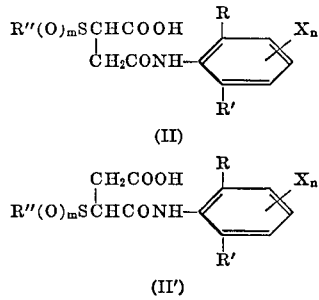

wherein R, R', X, R", n and m are as defined previously, is ring-closed by dehydration to obtain an N-phenylsuccinimide derivative represented by the Formula I.

Process (2): An N-phenylmaleimide derivative represented by the Formula III,

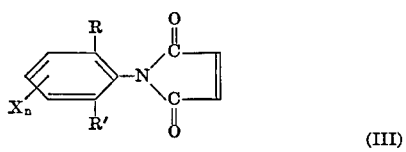

wherein R, R', X and n are as defined previously, is added to a compound represented by the Formula IV,

wherein R" is as defined previously, to obtain an N-phenylsuccinimide derivative represented by the Formula I',

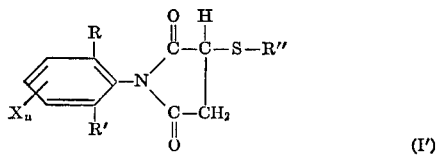

wherein R, R', X, R" and n are as defined previously.

Process (3): An N-phenylsuccinimide derivative represented by the Formula I',

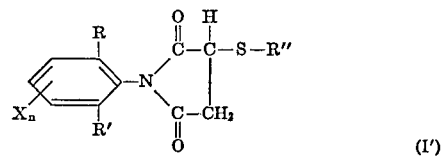

wherein R, R', X, R" and n are as defined previously, is oxidized to obtain an N-phenylsuccinimide derivative represented by the Formula I",

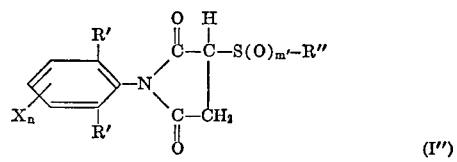

wherein R, R', X, R" and n are as defined previously; and $m'$ is 1 or 2.

According to the process (1) of the present invention, the N-phenylsuccinic acid monoamide derivative represented by the Formula II or II' is heated with stirring in the presence of a suitable dehydrating agent, e.g. acetic anhydride, phosphorus pentoxide, phosphorus oxychloride or acetyl chloride (preferably acetic anhydride), whereby the desired compound having the Formula I is obtained easily. If necessary, this reaction may be effected in a suitable solvent, e.g. toluene or benzene. Preferably, 2 to 10 times (by weight) of acetic anhydride against the starting compound is used as a solvent and a dehydrating agent. The heating temperature is not particularly limited, but is ordinarily from 20° to 140° C.

According to the process (2) of the present invention, the N-phenylmaleimide derivative of the Formula III is mixed with an equivalent of the compound having the Formula IV and, if necessary, the resulting mixture is heated, whereby the desired compound of the Formula I' is obtained. The heating temperature is not particularly limited, but is ordinarily from 0° to 100° C. Alternatively, the two starting materials are heated in a suitable organic solvent, e.g. a lower polar solvent, such as benzene, toluene, xylene, petroleum hydrocarbon, ether, chloroform, or carbon tetrachloride, preferably benzene or toluene, whereby the desired compound can be easily obtained in a high yield. If necessary, a basic catalyst, e.g. triethylamine, N,N-dimethylaniline, N,N-diethylaniline, pyridine, N-methylmorpholine or the like tertiary amine, preferably triethylamine, is added in a slight amount, e.g. 1% to 5% by weight of the starting compound, whereby the reaction proceeds more easily.

According to the process (3) of the present invention, the N-phenylsuccinimide derivative represented by the Formula I', i.e. the compound obtained according to the process (2) of the present invention, is oxidized with a suitable oxidizing agent, e.g. hydrogen peroxide, organic peracid, potassium permanganate, manganese dioxide or potassium bichromate, at 0° to 50° C. Preferably, 2 to 4 times (by moles) of hydrogen peroxide against the starting compound is used as an oxidizing agent. When the reaction is carried out in acetone, a sulfinyl compound represented by the Formula I', wherein m is 1 and R, X, R' and n are as defined previously is obtained easily, and when in acetic acid, a sulfonyl compound represented by the Formula I', wherein m is 2, is obtained easily.

Typical examples of the compound having the Formula II or II' which is used in the present process (1) are as follows:

| R, R' (ring substituents) | X_n | m | R'' |
|---|---|---|---|
| Cl, Cl (with Cl para) | — | 0, 1 or 2 | —CH₂—furanyl |
| Cl, Cl (tetrachloro) | — | 0, 1 or 2 | Same as above. |
| CH₃, CH₃ | — | 0, 1 or 2 | Do. |
| CH₃, CH₃ (with CH₃) | — | 0, 1 or 2 | —CH₂—C₆H₄—Br |
| CH₃, CH₃ | Br | 0, 1 or 2 | —CH₂—furanyl |
| C₂H₅, C₂H₅ | — | 0, 1 or 2 | —CH₂—C₆H₄—C₂H₅ |
| CH(CH₃)₂, CH(CH₃)₂ | — | 0, 1 or 2 | —CH₂—C₆H₄—OCH₃ |
| CH₃, CH₃ | — | 0, 1 or 2 | —CH₂COOC₂H₅ |
| C₂H₅, C₂H₅ | — | 0, 1 or 2 | —CH₂COOC₂H₅ |
| C₃H₇(iso), C₃H₇(iso) | — | 0, 1 or 2 | —CH₂—COOC₂H₅ |
| CH₃, C₂H₅ | — | 0, 1 or 2 | —CH₂—COOC₂H₅ |
| Cl, Cl | — | 0, 1 or 2 | —CH₂—COOC₂H₅ |
| Cl, Cl (tetrachloro) | — | 0, 1 or 2 | —CH₂COOC₂H₅ |
| CH₃, CH₃ (with CH₃) | — | 0, 1 or 2 | —CH₂—COOCH₃ |
| CH₃, CH₃ (with CH₃, CH₃) | — | 0, 1 or 2 | —CH₂—COOCH₃ |
| Br, Br | — | 0, 1 or 2 | —CH₂—COOC₂H₅ |
| Cl, Cl | CH₃O | 0, 1 or 2 | —CH₂—COOC₂H₅ |
| CH₃, CH₃ | O₂N | 0, 1 or 2 | —CH₂—COOC₂H₅ |
| Cl, Cl | — | 0 or 1 | —CH₂CH₂CH₂CH₃ |
| Same as above | — | 0 | —CH₂—C₆H₅ |
| Do. | — | 0 | —C₆H₄—CH₃ |
| Do. | — | 0 | —C₆H₄—Cl |
| CH₃, CH | — | 0 or 1 | —CH₂—C₆H₅ |

Typical examples of the N-phenylmaleimide derivative having the Formula III and the compound having the Formula IV which are used in the present process (2) are as follows:

N-substituted phenylmaleimides:

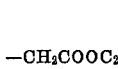

Thiol compounds:

HSCH$_2$COOCH$_3$
HSCH$_2$COOC$_2$H$_5$
HSCH$_2$COOC$_3$H$_7$(n)
HSCH$_2$COOC$_3$H$_7$(iso)
HSCH$_2$COOC$_4$H$_9$(n)
HSCH$_2$COOC$_4$H$_9$(tert)

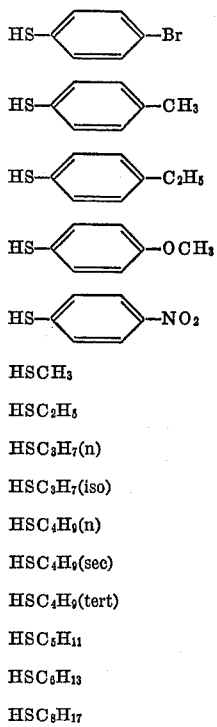

HSCH₃
HSC₂H₅
HSC₃H₇(n)
HSC₃H₇(iso)
HSC₄H₉(n)
HSC₄H₉(sec)
HSC₄H₉(tert)
HSC₅H₁₁
HSC₆H₁₃
HSC₈H₁₇

In actual application, the thus obtained compounds of the present invention may be used as they are without incorporation of other components. Alternatively, they may be used in admixture with carriers for easier application as microbicides. They can be formulated into any of the ordinarily adopted forms such as, for example, dusts, wettable powders, oil sprays, aerosols, tablets, emulsifiable concentrates and granules.

Further, the present compounds may be used in admixture with one or more of other chemicals such as, for example, Blasticidin-S, Kasugamycin, polyoxin, cellocidin, 3 - [2 - (3,5 - dimethyl-2-oxocyclohexyl)-2-hydroxyethyl]glutarimide, streptomycin, griseofulvin, pentachlorophenol (including salts), pentachlorobenzyl alcohol,
pentachlorobenzaldoxime,
zinc ethylenebis dithiocarbamate,
zinc dimethyl dithiocarbamate,
manganese ethylenebis dithiocarbamate,
1,2-bis[(3-methoxycarbonyl)thioureido]benzene,
1,2-bis[(3-ethoxycarbonyl)thioureido]benzene,
2,3-dichloro-1,4-naphthoquinone,
tetrachloro-p-benzoquinone,
p-dimethylaminobenzene diazonium sulfonate,
2-(1-methylheptyl)-4,6-dinitrophenyl crotonate,
2-heptadecyl imidazoline acetate,
2,4-dichloro-6-(o-chloroanilino)-S-triazine,
dodecylguanidine acetate,
6-methyl-2,3-quinoxaline dithio cyclic-S,S-dithiocarbonate,
2,3-quinoxaline dithiol cyclic trithiocarbonate,
N-trichloromethylthio-4-cyclohexene-1,2-dicarboximide,
N-(1,1,2,2-tetrachloroethylthio)-4-cyclohexene-1,2-dicarboximide,
N-(3',5'-dichlorophenyl) maleimide,
N-(3',5'-dichlorophenyl) succinimide,
N-(3',5'-dichlorophenyl) itaconimide,
3-(3',5'-dichlorophenyl)-5,5-dimethyloxazolidine-2,4-dione,
2,3-dihydro-5-carboxanilide-6-methyl-1,4-oxathiin-4,4-dioxide,
2,3-dihydro-5-carboxanilide-6-methyl-1,4-oxathiin,
1-(N-n-butylcarbamoyl)-2-methoxycarbonylamino benzimidazole,
O,O-diethyl-S-benzyl phosphorothioate,
O-ethyl-S,S-diphenyl phosphorodithioate,
O-butyl-S-benzyl-S-ethyl phosphorodithioate,
O-ethyl-O-phenyl-O-(2,4,5-trichlorophenyl) phosphate,
O,O-dimethyl-O-(3-methyl-4-nitrophenyl) phosphorothioate,
S-[1,2-bis(ethoxycarbonyl)ethyl]-O,O-dimethyl phosphorodithioate,
O,O-dimethyl-S-(N-methylcarbamoyl) phosphorodithioate,
O,O-diethyl-O-(2-isopropyl-6-methyl-4-pyrimidinyl) thiophosphate,
3,4-dimethylphenyl N-methylcarbamate,
iron methylarsonate,
2-chloro-4,6-bis(ethylamino) S-triazine,
2,4-dichlorophenoxyacetic acid (including salts and esters),
2-methyl-4-chlorophenoxyacetic acid (including salts and esters),
2,4-dichlorophenyl-4'-nitrophenyl ether,
sodium pentachlorophenolate,
N-(3,4-dichlorophenyl) propionamide,
3-(3,4-dichlorophenyl)-1,1-dimethylurea,
α,α,α-trifluoro-2,6-dinitro-N,N-di-n-propyl-p-toluidine,
2-chloro-2',6'-diethyl-N-(methoxymethyl) acetamide,
1-naphthyl N-methylcarbamate,
methyl N-(3,4-dichlorophenyl) carbamate,
4-chlorobenzyl N,N-dimethylthiol carbamate,
N,N-diallyl-2-chloroacetamide,
ethyl-β-(2,4-dichlorophenoxy) acrylate and cyclohexyl β-(2,4-dichlorophenoxy) acrylate.

In every case, the controlling effects of individual chemicals are not deteriorated. Accordingly, the simultaneous control of 2 or more diseases is possible, and synergistic effects due to mixing can be expected. In addition thereto, the present compounds may be used in admixture with such agricultural chemicals as nematocides or miticides and with fertilizers.

The present invention is illustrated in further detail below with reference to examples, but it is needless to say that the scope of the invention is not limited thereto. In the examples, parts and percentages are by weight unless otherwise specified.

EXAMPLE 1

Standard operational procedures for practicing the processes of the present invention are set forth below.

(1-1) Present process (1): A mixture comprising 0.1 mole of an N-phenylsuccinic acid monoamide represented by the Formula II or II', 50 ml. of acetic anhydride and 1 g. of anhydrous sodium acetate is fed to a 100 ml. four-necked flask, and heated with stirring at 100° C. for 1 hour. Thereafter, acetic acid and acetic anhydride are removed by distillation under reduced pressure, and the residue is washed with water and then dried to obtain in a high yield a desired N-phenylsuccinimide derivative represented by the Formula I.

The results obtained according to the above-mentioned standard operational procedure are set forth in Table 1.

(1-2) Present process (2): A mixture comprising 0.1 mole of an N-phenylmaleimide represented by the Formula III, a thiol represented by the Formula IV and 100 ml. of benzene is fed to a 200 ml. four-necked flask. To the mixture is added with stirring 5 ml. of benzene containing a catalytic amount of triethylamine, and the stirring is further continued for 30 minutes. Thereafter, the benzene is removed by distillation under reduced pressure to obatin in a high yield an N-phenylsuccinimide derivative represented by the Formula I'.

The results obtained according to the above-mentioned standard operational procedure are set forth in Table 1.

(1-3) Present process (3): A mixture comprising 0.1 mole of an N-phenylsuccinimide derivative represented by the Formula I' and 100 ml. of acetone is fed to a 300 ml. four-necked flask. The mixture is charged with 0.3 mole of a 10% aqueous hydrogen peroxide solution, and then stirred at 50° C. for 5 hours. Subsequently, the reaction mixture is poured into ice water, and deposited crystals are collected by filtration, washed with water and then dried to obtain in a high yield a desired N-phenylsuccinimide derivative represented by the Formula I″, wherein $m$ is 1.

The results obtained according to the above-mentioned standard operational procedure are set forth in Table 1.

(1-4) Present process (3): A mixture comprising 0.1 mole of an N-phenylsuccinimide derivative represented by the Formula I′ or I″, wherein $m$ is 1, and 50 ml. of glacial acetic acid is fed to a 200 ml. four-necked flask. The mixture is charged with 0.3 mole of a 10% aqueous hydrogen peroxide solution, and then stirred at 50° C. for 20 hours. Subsequently, the reaction mixture is poured into ice water, and deposited crystals are collected by filtration, washed with water and then dried to obtain a desired N-phenylsuccinimide derivative represented by the Formula I″, wherein $m$ is 2.

TABLE 1

| Compound number | Structure | Preparation process (Ex. No.) | Yield (Percent) | Physical constant | Elementary analysis, percent ||||
|---|---|---|---|---|---|---|---|---|
| | | | | | | C | H | N | S |
| (1) | [structure with Cl, Cl, S CH₂CH₂CH₂CH₃] | 1-1 | 87 | M.P. 61–62.5° C. | Calcd___ | 50.31 | 4.55 | 4.15 | 9.65 |
| | | 1-2 | 89 | | Found__ | 50.50 | 4.56 | 4.22 | 9.51 |
| (2) | [structure with Cl, Cl, S CH₂–phenyl] | 1-1 | 91 | M.P. 86–87.5° C. | Calcd___ | 55.74 | 3.58 | 3.83 | 8.75 |
| | | 1-2 | 93 | | Found__ | 55.80 | 3.52 | 3.59 | 8.92 |
| (3) | [structure with Cl, Cl, S–phenyl–CH₃] | 1-1 | 89 | M.P. 110–110.5° C. | Calcd___ | 55.74 | 3.58 | 3.83 | 8.75 |
| | | 1-2 | 94 | | Found__ | 55.92 | 3.46 | 3.95 | 8.52 |
| (4) | [structure with Cl, Cl, S–phenyl–Cl] | 1-1 | 92 | M.P. 89.5–91.5° C. | Calcd___ | 49.69 | 2.61 | 3.62 | 8.29 |
| | | 1-2 | 93 | | Found__ | 49.47 | 2.51 | 3.40 | 8.18 |
| (5) | [structure with Cl, Cl, S CH₂CH₂CH₂CH₃, O] | 1-3 | 96 | M.P. 140–141.5° C. | Calcd___ | 48.28 | 4.35 | 4.02 | 9.21 |
| | | | | | Found__ | 48.26 | 4.40 | 4.57 | 9.15 |
| (6) | [structure with CH₃, CH₃, S CH₂CH₂CH₂CH₃] | 1-1 | 92 | $n_D^{25}$ 1.5507 | Calcd___ | 65.93 | 7.28 | 4.81 | 11.00 |
| | | 1-2 | 94 | | Found__ | 65.91 | 7.39 | 4.98 | 10.83 |
| (7) | [structure with CH₃, CH₃, S CH₂–phenyl] | 1-1 | 90 | M.P. 86–87° C. | Calcd___ | 70.31 | 5.56 | 4.37 | 9.78 |
| | | 1-2 | 92 | | Found__ | 70.33 | 5.60 | 4.32 | 9.88 |
| (8) | [structure with CH₃, CH₃, S–phenyl–CH₃] | 1-1 | 91 | M.P. 105–106.5° C. | Calcd___ | 70.12 | 5.90 | 4.30 | 9.85 |
| | | 1-2 | 94 | | Found__ | 70.09 | 5.81 | 4.21 | 9.61 |

TABLE 1—Continued

N-phenylsuccinimide derivative obtained

| Compound number | Structure | Preparation process (Ex. No.) | Yield (Percent) | Physical constant | Elementary analysis, percent | | | | |
|---|---|---|---|---|---|---|---|---|---|
| | | | | | | C | H | N | S |
| (9) | [structure: 2,6-dimethylphenyl-N-succinimide-S-C₆H₄-Cl] | 1-1<br>1-2 | 93<br>95 | M.P. 99.5–101° C. | Calcd<br>Found | 62.51<br>62.52 | 4.67<br>4.66 | 4.05<br>4.04 | 9.27<br>9.04 |
| (10) | [structure: 2,6-dimethylphenyl-N-succinimide-S-CH₂CH₂CH₂CH₃] | 1-3 | 90 | M.P. 182–110° C. | Calcd<br>Found | 62.50<br>62.70 | 6.90<br>6.73 | 4.56<br>4.46 | 10.43<br>10.33 |
| (11) | [structure: 2,6-dimethylphenyl-N-succinimide-SCH₂-C₆H₅] | 1-3 | 89 | M.P. 182–183.5° C. | Calcd<br>Found | 67.03<br>66.94 | 5.34<br>5.45 | 4.12<br>3.92 | 9.42<br>9.27 |
| (12) | [structure: 2,6-diethylphenyl-N-succinimide-S-CH₂CH₂CH₂CH₃] | 1-1<br>1-2 | 92<br>93 | M.P. 49.5–51° C. | Calcd<br>Found | 67.66<br>68.50 | 7.90<br>80.7 | 4.38<br>4.52 | 10.03<br>9.81 |
| (13) | [structure: 2,6-diethylphenyl-N-succinimide-SCH₂-C₆H₅] | 1-1<br>1-2 | 91<br>94 | $n_D^{21}$ 1.5869 | Calcd<br>Found | 71.34<br>71.13 | 6.57<br>6.77 | 3.96<br>4.16 | 9.07<br>9.01 |
| (14) | [structure: 2,6-diethylphenyl-N-succinimide-S-C₆H₄-Cl] | 1-1<br>1-2 | 90<br>91 | M.P. 142.5–144.5° C. | Calcd<br>Found | 64.24<br>64.22 | 5.50<br>5.56 | 3.75<br>4.00 | 8.57<br>8.27 |
| (15) | [structure: 2,6-diethylphenyl-N-succinimide-SCH₂-C₆H₅] | 1-3 | 85 | M.P. 177.5–179.5° C. | Calcd<br>Found | 68.26<br>68.23 | 6.29<br>6.37 | 3.79<br>4.07 | 8.68<br>8.49 |
| (16) | [structure: 2,4,6-trichlorophenyl-N-succinimide-S-C₆H₄-Cl] | 1-1<br>1-2 | 92<br>90 | M.P. 107–109° C. | Calcd<br>Found | 45.63<br>45.53 | 2.16<br>2.10 | 3.33<br>3.25 | 7.61<br>7.44 |
| (17) | [structure: 2,4,6-trichlorophenyl-N-succinimide-SCH₂-C₆H₅] | 1-3 | 87 | M.P. 157.5–159° C. | Calcd<br>Found | 49.00<br>49.16 | 2.91<br>3.03 | 3.36<br>3.35 | 7.69<br>7.41 |
| (18) | [structure: 2,4,6-trichlorophenyl-N-succinimide-SCH₂CH₂CH₂CH] | 1-2 | 93 | B.P. 0.5 201° C. | Calcd<br>Found | 45.85<br>45.95 | 3.86<br>3.81 | 3.82<br>3.73 | 8.74<br>8.83 |
| (19) | [structure: 2,4,6-trichlorophenyl-N-succinimide-SCH₂(CH₂)₆CH₃] | 1-2 | 94 | $n_D^{20}$ 1.5564 | Calcd<br>Found | 51.13<br>51.17 | 5.25<br>5.41 | 3.58<br>3.46 | 7.58<br>7.56 |

TABLE 1—Continued

N-phenylsuccinimide derivative obtained

| Compound number | Structure | Preparation process (Ex. No.) | Yield (Percent) | Physical constant | Elementary analysis, percent | | | | |
|---|---|---|---|---|---|---|---|---|---|
| | | | | | | C | H | N | S |
| (20) | 2,6-dichlorophenyl succinimide with S-C6H4-CH3 (Cl also at 4-position) | 1-1<br>1-2 | 91<br>94 | M.P. 118.5–120.5° C. | Calcd<br>Found | 50.95<br>50.85 | 3.02<br>3.11 | 3.50<br>3.45 | 8.00<br>8.20 |
| (21) | 2,6-dimethylphenyl succinimide with SCH2-furyl | 1-1<br>1-2 | 90<br>91 | $n_D^{27}$ 1.5799 | Calcd<br>Found | 64.73<br>64.67 | 5.44<br>5.43 | 4.44<br>4.29 | 10.16<br>10.90 |
| (22) | 2,6-dimethylphenyl succinimide with S(O)CH2-furyl | 1-3 | 87 | M.P. 169° C.[1] | Calcd<br>Found | 61.61<br>61.39 | 5.18<br>5.27 | 4.23<br>4.00 | 9.67<br>9.88 |
| (23) | 2,6-diethylphenyl succinimide with SCH2-C6H4-CH3 | 1-1<br>1-2 | 85<br>93 | M.P. 86.5–87.5° C. | Calcd<br>Found | 71.89<br>71.76 | 6.87<br>6.75 | 3.81<br>3.59 | 8.72<br>8.47 |
| (24) | 2,6-diethylphenyl succinimide with S(O)CH2-C6H4-CH3 | 1-3 | 95 | M.P. 136.5–138° C. | Calcd<br>Found | 68.89<br>68.90 | 6.58<br>6.52 | 3.65<br>3.72 | 8.36<br>8.50 |
| (25) | 2,6-diethylphenyl succinimide with SCH2-C6H4-Cl | 1-1<br>1-2 | 92<br>93 | $n_D^{27.5}$ 1.5926 | Calcd<br>Found | 65.01<br>64.83 | 5.73<br>5.64 | 3.61<br>3.36 | 8.26<br>8.21 |
| (26) | 2,6-diethylphenyl succinimide with S(O)CH2-C6H4-Cl | 1-3 | 91 | M.P. 164–165° C. | Calcd<br>Found | 62.44<br>62.32 | 5.50<br>5.61 | 3.47<br>3.55 | 7.94<br>7.61 |
| (27) | 2,6-dimethylphenyl succinimide with SCH2COOC2H5 | 1-1<br>1-2 | 92<br>95 | M.P. 78.5–79.5° C. | Calcd<br>Found | 59.78<br>59.47 | 5.97<br>5.88 | 4.36<br>4.22 | 9.9[7]<br>9.6 |
| (28) | 2,6-dimethylphenyl succinimide with S(O)CH2COOC2H5 | 1-3 | 90 | M.P. 112.5–114.5° C. | Calcd<br>Found | 56.95<br>57.06 | 5.69<br>5.73 | 4.15<br>4.09 | 9.50<br>9.31 |
| (29) | 2,6-dimethylphenyl succinimide with SO2CH2COOC2H5 | 1-1<br>1-4 | 87<br>91 | M.P. 125–127° C. | Calcd<br>Found | 54.37<br>54.51 | 6.54<br>6.38 | 3.96<br>3.88 | 9.07<br>9.21 |

TABLE 1—Continued

N-phenylsuccinimide derivative obtained

| Compound number | Structure | Preparation process (Ex. No.) | Yield (Percent) | Physical constant | Elementary analysis, percent | | | |
|---|---|---|---|---|---|---|---|---|
| | | | | | | C | H | N | S |
| (30) | 2,6-dichlorophenyl-N-succinimide-SO₂CH₂CH₂CH₂CH₃ | 1-4 | 89 | M.P. 127.5–129° C. | Calcd... 46.16 4.16 3.85 8.80 / Found.. 46.24 4.03 3.87 8.95 |
| (31) | 2,6-dimethylphenyl-N-succinimide-SO₂CH₂-phenyl | 1-4 | 92 | M.P. 145–147° C. | Calcd... 64.06 5.71 3.77 8.63 / Found.. 64.21 5.69 3.83 8.55 |
| (32) | 2,6-diethylphenyl-N-succinimide-SO₂CH₂-phenyl | 1-4 | 93 / 95 | M.P. 196–197° C. | Calcd... 65.42 6.03 3.63 8.32 / Found.. 65.56 6.07 3.66 8.45 |
| (33) | 2,6-dimethylphenyl-N-succinimide-SO₂-(4-methoxyphenyl) | 1-4 | 94 | M.P. 231–232.5° C. | Calcd... 61.10 5.14 3.75 8.58 / Found.. 61.38 4.92 3.60 8.65 |
| (34) | 2,6-diethylphenyl-N-succinimide-SO₂CH₂-phenyl | 1-4 | 91 | M.P. 104.5–106.5° C. | Calcd... 66.13 6.32 3.51 8.02 / Found.. 66.10 6.35 3.45 8.12 |
| (35) | 2,6-diisopropylphenyl-N-succinimide-SO₂CH₂-phenyl | 1-4 | 93 | M.P. 201–202.5° C. | Calcd... 66.60 6.59 3.39 7.75 / Found.. 66.60 6.67 3.33 7.68 |
| (36) | 2,6-dimethylphenyl-N-succinimide-SO₂CH₂-furyl | 1-4 | 90 | M.P. 145–146° C. | Calcd... 58.77 4.94 4.03 9.23 / Found.. 58.65 4.83 4.12 9.31 |
| (37) | 4-bromo-2,6-dimethylphenyl-N-succinimide-SO₂CH₂-phenyl | 1-4 | 89 | M.P. 189.5–190.5° C. | Calcd... 52.30 4.17 3.21 7.35 / Found.. 52.50 4.18 3.30 7.28 |
| (38) | 2,6-diethylphenyl-N-succinimide-SO₂CH₂-(4-chlorophenyl) | 1-4 | 92 | M.P. 170–171.5° C. | Calcd... 60.06 5.29 3.34 7.63 / Found.. 60.03 5.42 3.41 7.63 |
| (39) | 2,6-dimethylphenyl-N-succinimide-S-phenyl | 1-2 | 95 | M.P. 120–122° C. | Calcd... 69.42 5.51 4.50 10.29 / Found.. 69.74 5.48 4.30 10.08 |

TABLE 1—Continued

N-phenylsuccinimide derivative obtained

| Compound number | Structure | Preparation process (Ex. No.) | Yield (percent) | Physical constant | Elementary analysis, percent | | | |
|---|---|---|---|---|---|---|---|---|
| | | | | | C | H | N | S |
| (40) | [structure: 2,6-dimethylphenyl-N-succinimide with S(O)₂-phenyl] | 1-4 | 90 | M.P. 150–153° C. | Calcd... 62.95 / Found.. 62.99 | 5.00 / 5.09 | 4.08 / 4.01 | 9.34 / 9.12 |
| (41) | [structure: 2,6-dimethylphenyl-N-succinimide with S(O)₂CH₂CH₂CH(CH₃)₂] | 1-4 | 91 | M.P. 120–121° C. | Calcd... 59.41 / Found.. 59.61 | 6.56 / 6.57 | 4.33 / 4.27 | 9.91 / 10.11 |
| (42) | [structure: 2,6-dimethylphenyl-N-succinimide with SCH₂CH₂CH₂-phenyl] | 1-2 | 89 | M.P. 50–51° C. | Calcd... 71.34 / Found.. 71.33 | 6.57 / 6.59 | 3.96 / 3.91 | 9.07 / 9.19 |
| (43) | [structure: 2,6-dimethylphenyl-N-succinimide with SCH₂CH=CH₂] | 1-1 / 1-2 | 89 / 90 | M.P. 78–80° C. | Calcd... 69.45 / Found.. 69.25 | 6.62 / 6.41 | 5.40 / 5.29 | 12.36 / 12.37 |
| (44) | [structure: 2-methyl-6-ethylphenyl-N-succinimide with S(O)CH₂-phenyl] | 1-3 | 88 | M.P. 139–141° C. | Calcd... 67.57 / Found.. 67.52 | 5.97 / 5.87 | 3.94 / 4.00 | 9.02 / 9.20 |
| (45) | [structure: 2-methyl-6-ethylphenyl-N-succinimide with S(O)₂CH₂-phenyl] | 1-4 | 91 | M.P. 159–160° C. | Calcd... 64.66 / Found.. 64.78 | 5.71 / 5.69 | 3.77 / 3.75 | 8.63 / 8.72 |

EXAMPLE 2

Dust: 2 parts of the Compound 1 and 98 parts of clay are sufficiently pulverized and mixed together to obtain a dust containing 2% of active ingredient. In application, the dust may be dusted as it is or may be mixed with soil.

EXAMPLE 3

Dust: 2 parts of the Compound 21 and 98 parts of clay are sufficiently pulverized and mixed together to obtain a dust containing 2% of active ingredient. In application, the dust is dusted as it is.

EXAMPLE 4

Dust: 3 parts of the Compound 25 and 97 parts of talc are sufficiently pulverized and mixed together to obtain a dust containing 3% of active ingredient. In application, the dust is dusted as it is.

EXAMPLE 5

Dust: 3 parts of the Compound 30 and 97 parts of talc are sufficiently pulverized and mixed together to obtain a dust containing 3% of active ingredient. In application, the dust may be dusted as it is or may be used for coating treatment.

EXAMPLE 6

Wettable powder: 50 parts of the Compound 6, 5 parts of a wetting agent (calcium salt of alkylbenzene-sulfonic acid) and 45 parts of diatomaceous earth are sufficiently pulverized and mixed together to obtain a wettable powder containing 50% of active ingredient. In application, the wettable powder is diluted with water, and the dilution may be sprayed or may be used for immersion treatment.

EXAMPLE 7

Wettable powder: 50 parts of the Compound 26, 5 parts of a wetting agent (alkylbenzenesulfonic type) and 45 parts of diatomaceous earth are sufficiently pulverized and mixed together to obtain a wettable powder containing 50% of active ingredient. In application, the wettable powder is diluted with water, and the dilution is sprayed.

EXAMPLE 8

Wettable powder: 50 parts of the Compound 32, 5 parts of a wetting agent (alkylbenzenesulfonate type) and 45 parts of diatomaceous earth are sufficiently pulverized and mixed together to obtain a wettable powder containing 50% of active ingredient. In application, the wettable powder is diluted, and the dilution may be sprayed or may be used for immersion treatment.

EXAMPLE 9

Emulsifiable concentrate: 10 parts of the Compound 17, 80 parts of dimethyl sulfoxide and 10 parts of an emulsifier (polyoxyethylene phenylphenol ether) are mixed together to obtain an emulsifiable concentrate containing 10% of active ingredient. In application, the emulsifiable concentrate may be used as it is or may be sprayed after dilution with water.

EXAMPLE 10

Emulsifiable concentrate: 10 parts of the Compound 24, 80 parts of dimethyl sulfoxide and 10 parts of an emulsifier (polyoxyethylene phenylphenol ether type) are mixed together to obtain an emulsifiable concentrate containing 10% of active ingredient. In application, the emulsifiable concentrate is diluted with water, and the dilution is sprayed or may be used for immersion treatment.

EXAMPLE 11

Emulsifiable concentrate: 10 parts of the Compound 31, 80 parts of dimethyl sulfoxide and 10 parts of an emulsifier (polyoxyethylene phenylphenol ether type) are mixed together to obtain an emulsifiable concentrate containing 10% of active ingredient. In application, the emulsifiable concentrate may be used as it is or may be sprayed after dilution with water.

EXAMPLE 12

Granule: 5 parts of the Compound 6, 93.5 parts of clay and 1.5 parts of a binder (polyvinyl alcohol) are sufficiently pulverized and mixed together. The resulting mixture is kneaded with water, and then granulated and dried to obtain a granule containing 5% of active ingredient. In application, the granule is sprinkled as it is.

EXAMPLE 13

Granule: 5 parts of the Compound 23, 93.5 parts of clay and 1.5 parts of a binder (polyvinyl alcohol type) are sufficiently pulverized and mixed together. The resulting mixture is kneaded with water, and then granulated and dried to obtain a granule containing 5% of active ingredient.

EXAMPLE 14

Granule: 5 parts of the Compound 33, 93.5 parts of clay and 1.5 parts of a binder (polyvinyl alcohol type) are sufficiently pulverized and mixed together. The resulting mixture is kneaded with water, and then granulated and dried to obtain a granule containing 5% of active ingredient. In application, the granule is sprinkled as it is.

EXAMPLE 15

Composite dust: 2 parts of the Compound 4, 1.4 parts of O-n-butyl-S-ethyl-S-benzyl phosphorodithiolate, 0.1 part of Kasugamycin and 96.5 parts of clay are sufficiently pulverized and mixed together to obtain a dust containing 3.5% of active ingredient.

EXAMPLE 16

Composite dust: 2 parts of the Compound 10, 1.5 parts of N-(3',5'-dichlorophenyl) succinimide, 2 parts of O,O-dimethyl-O-(3-methyl-4-nitrophenyl) phosphorothioate, 1.5 parts of 3,4-dimethylphenyl-N-methylcarbamate and 93 parts of clay are sufficiently pulverized and mixed together to obtain a dust containing 7% of active ingredient.

EXAMPLE 17

Composite dust: 2 parts of the Compound 24, 1.5 parts of O-n-butyl-S-benzyl phosphorodithioate and 96.5 parts of clay are sufficiently pulverized and mixed together to obtain a dust containing 3.5% of active ingredient. In application, the dust is dusted as it is.

EXAMPLE 18

Composite dust: 2 parts of the Compound 25, 0.1 parts of Kasugamycin, 2 parts of O,O-dimethyl-O-(3-methyl-4-nitrophenyl) phosphorothioate, 1.5 parts of 3,4-dimethylphenyl-N-methylcarbamate and 94.4 parts of clay are sufficiently pulverized and mixed together to obtain a dust containing 5.6% of active ingredient. In application, the dust is dusted as it is.

EXAMPLE 19

Composite dust: 2 parts of the Compound 21, 1.5 parts of N-(3',5'-dichlorophenyl) succinimide, 2 parts of O,O-dimethyl - O-(3-methyl-4-nitrophenyl) phosphorothioate, 1.5 parts of 3,4-dimethylphenyl-N-methylcarbamate and 93 parts of clay are sufficiently pulverized and mixed together to obtain a dust containing 7% of active ingredient.

EXAMPLE 20

Composite dust: 2 parts of the Compound 31, 1.5 parts of O - n-butyl-S-ethyl-S-benzyl phosphorodithiolate and 96.5 parts of clay are sufficiently pulverized and mixed together to obtain a dust containing 3.5% of active ingredient. In application, the dust is dusted as it is.

EXAMPLE 21

Composite dust: 2 parts of the Compound 30, 0.1 part of Kasugamycin, 2 parts of O,O-dimethyl-O-(3-methyl-4-nitrophenyl) phosphorothioate, 1.5 parts of 3,4-dimethylphenyl-N-methylcarbamate and 94.4 parts of clay are sufficiently pulverized and mixed together to obtain a dust containing 5.6% of active ingredient. In application, the dust is dusted as it is.

EXAMPLE 22

Composite dust: 2 parts of the Compound 32, 1.5 parts of N-(3',5'-dichlorophenyl) succinimide, 2 parts of O,O-dimethyl - O-(3-methyl-4-nitrophenyl) phosphorothioate, 1.5 parts of 3,4-dimethylphenyl-N-methylcarbamate and 93 parts of clay are sufficiently pulverized and mixed together to obtain a dust containing 7% of active ingredient.

EXAMPLE 23

Composite wettable powder: 30 parts of the Compound 18, 10 parts of zinc ethylenebis dithiocarbamate, 10 parts of 1,2 - bis[(3-methoxycarbonyl)thioureido]benzene, 5 parts of calcium salt of alkylbenzenesulfonic acid and 45 parts of diatomaceous earth are sufficiently pulverized and mixed together to obtain a wettable powder containing 50% of active ingredient.

EXAMPLE 24

Composite wettable powder: 30 parts of the Compound 23, 10 parts of zinc ethylenebis dithiocarbamate, 10 parts of 1,2-bis[(3-ethylenebis dithiocarbamate, 10 parts of 1,2-bis[(3-ethoxycarbonyl)thioureido]benzene, 5 parts of calcium salt of alkylbenzenesulfonic acid and 45 parts of diatomaceous earth are sufficiently pulverized and mixed together to obtain a wettable powder containing 50% of active ingredient.

EXAMPLE 25

Composite wettable powder: 30 parts of the Compound 3, 10 parts of zinc ethylenebis dithiocarbamate, 10 parts of 1,2-bis[(3-ethoxycarbonyl)thiouredio]benzene, 5 parts of calcium salt of alkylbenzenesulfonic acid and 45 parts of diatomaceous earth are sufficiently pulverized and mixed together to obtain a wettable powder containing 50% of active ingredient.

In order to substantiate the fact that the N-phenylsuccinimide derivatives according to the present invention have specifically marked microbicidal effects as compared with known homologous compounds, typical test results are set forth below.

Known homologous compounds (Controls):

a) 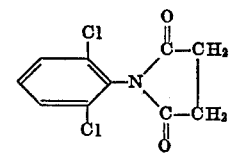

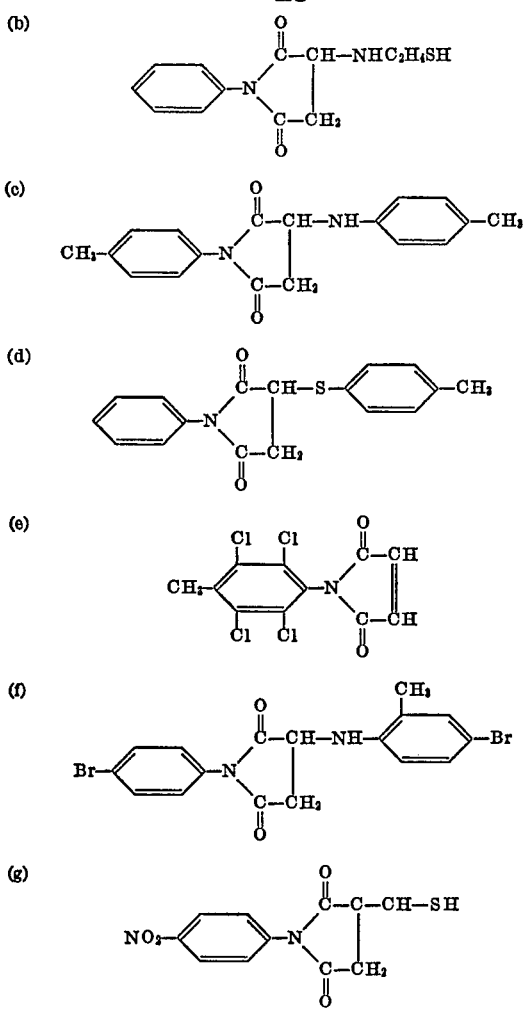

(b)

(c)

(d)

(e)

(f)

(g)

TEST EXAMPLE 1

Rice blast-controlling effects: To rice plants (variety: "Waseasahi"), which had been cultivated to the 3-leaves stage in flower pots of 9 cm. in diameter was dusted by use of a duster with 100 mg. per pot, each dust of the test compounds set forth in Table 2. After 1 day, the rice plants were sprayed to be inoculated with a spore-suspension of rice blast fungus (*Pyricularia oryzae*), which had been cultured in an oatmeal medium, and 5 days thereafter, the number of diseased spots generated in the upper leaves was counted to investigate the fungicidal effects of individual compounds. As the result, the present compounds were comparable in effectiveness to the control compounds, and displayed far more marked controlling effect than the known compounds, as shown in Table 2.

TABLE 2

| | Active ingredient concentration, percent | Number of spots per 10 leaves |
|---|---|---|
| Compound number: | | |
| (1) | 2.0 | 14.2 |
| (2) | 2.0 | 4.5 |
| (3) | 2.0 | 5.6 |
| (4) | 2.0 | 2.1 |
| (5) | 2.0 | 0.8 |
| (7) | 2.0 | 10.2 |
| (8) | 2.0 | 8.7 |
| (9) | 2.0 | 15.6 |
| (10) | 2.0 | 1.2 |
| (11) | 2.0 | 0.9 |
| (13) | 2.0 | 9.4 |
| (15) | 2.0 | 0.0 |
| (16) | 2.0 | 6.7 |
| (17) | 2.0 | 0.0 |
| (18) | 2.0 | 2.1 |
| (19) | 2.0 | 18.2 |
| (20) | 2.0 | 2.9 |
| Known compound: | | |
| (a) | 2.0 | 202.3 |
| (b) | 2.0 | 456.1 |
| (c) | 2.0 | 411.2 |
| (d) | 2.0 | 318.6 |
| (e) | 2.0 | 275.7 |
| (f) | 2.0 | 356.2 |
| (g) | 2.0 | 482.1 |
| Non-spraying | | 506.4 |

TEST EXAMPLE 2

Rice blast-controlling effects: To rice plants (variety: "Kinki No. 33"), which had been cultivated to the 4-leaves stage in flower pots of 9 cm. in diameter, was sprayed at a rate of 10 ml. per pot, each solution of the test compounds set forth in Table 3. After 24 hours, the rice plants were sprayed to be inoculated with a spore-suspension of rice blast fungus (*Pyricularia oryzae*), which had been cultured in an oatmeal medum, and 3 days thereafter, the number of diseased spots generated on the upper leaves was counted to investigate the controlling effects of individual compounds to obtain the results as shown in Table 3. As is clear from Table 3, the present compounds were comparable in effectiveness to the known compounds, and displayed more marked controlling effects than the known compounds.

TABLE 3

| | Active ingredient concentration (p.p.m.) | Number of investigated leaves | Number of spots per leaf |
|---|---|---|---|
| Compound number: | | | |
| (21) | 500 | 15 | 4.1 |
| (22) | 500 | 15 | 0.5 |
| (23) | 500 | 15 | 1.0 |
| (24) | 500 | 15 | 0.8 |
| (25) | 500 | 15 | 7.2 |
| (26) | 500 | 15 | 0.3 |
| (27) | 500 | 18 | 3.4 |
| (28) | 500 | 18 | 1.2 |
| (29) | 500 | 18 | 1.9 |
|  | 500 | 18 | 2.0 |
|  | 500 | 18 | 2.8 |

TABLE 3—Continued

| | Active ingredient concentration (p.p.m.) | Number of investigated leaves | Number of spots per leaf |
|---|---|---|---|

Structure: diethylphenyl group with N-C(=O)-C(=O) ring, S—$CH_2COOC_2H_5$

| | 500 | 18 | 1.7 |
| (30) | 500 | 18 | 0.0 |
| (31) | 500 | 18 | 0.1 |
| (32) | 500 | 18 | 2.8 |
| (33) | 500 | 18 | 9.8 |
| (34) | 500 | 18 | 18.8 |
| (35) | 500 | 18 | 1.0 |
| (36) | 500 | 18 | 4.0 |
| (37) | 500 | 18 | 1.3 |
| (38) | 500 | 18 | 12.1 |
| Known compound: | | | |
| (a) | 500 | 15 | 19.1 |
| (b) | 500 | 15 | 38.3 |
| (c) | 500 | 15 | 44.2 |
| (d) | 500 | 15 | 27.6 |
| (e) | 500 | 15 | 29.9 |
| (f) | 500 | 15 | 30.5 |
| (g) | 500 | 15 | 48.6 |
| Non-spraying | | 15 | 50.7 |

TEST EXAMPLE 3

Bacterial-leaf-blight-of-rice-controlling effects: To the second leaves of rice plants (variety: "Kinmaze"), which had been cultivated to the 5-leaves stage in flower pots of 9 cm. in diameter, was inoculated by an improved pincette with 2 needles, a suspension of bacterial leaf blight bacterium (*Xanthomonas oryzae*). At each of the 24th hour and 48th hour after the inoculation, each solution of the test compounds set forth in Table 4, which were in the form of wettable powders incorporated with a spreader, was coated by a writing-brush on inoculation site of the leaves and, on the 7th day after the inoculation (5th day after second coating of the chemical solution), the leaves were investigated according to the BE method. As the result, the present compound displayed more excellent controlling effects than the control known compounds, as shown in Table 4.

Note.—The BE (Bacterial Exudation) method, which was devised by Mr. Isaka, a technical official of the Fukui Agriculture Experiment Station, is a method of Examination according to the extent of propagation of bacterium within the tissues of rice leaves, and it has been reported that the said method is high in correlation with rice fields. (Fukui Agriculture Experiment Station Report dated Feb. 1, 1965.)

TABLE 4

| | Active ingredient concentration (p.p.m.) | Number of investigated leaves | Degree of damage |
|---|---|---|---|
| Compound number: | | | |
| (21) | 1,000 | 20 | 20.0 |
| (22) | 1,000 | 20 | 10.0 |
| (24) | 1,000 | 20 | 10.0 |
| (26) | 1,000 | 20 | 5.0 |
| (27) | 1,000 | 20 | 20.5 |
| (28) | 1,000 | 20 | 18.5 |
| (29) | 1,000 | 20 | 9.6 |
| (30) | 1,000 | 20 | 10.0 |
| (31) | 1,000 | 20 | 5.0 |
| (32) | 1,000 | 20 | 5.0 |
| (33) | 1,000 | 20 | 15.0 |
| Known compound: | | | |
| (a) | 1,000 | 20 | 45.0 |
| (b) | 1,000 | 20 | 60.0 |
| (c) | 1,000 | 20 | 65.0 |
| (d) | 1,000 | 20 | 75.0 |
| (e) | 1,000 | 20 | 55.0 |
| (f) | 1,000 | 20 | 85.0 |
| (g) | 1,000 | 20 | 80.0 |
| Non-treatment | | 20 | 100.0 |

TEST EXAMPLE 4

Powdery-mildew-of-cucurbits-controlling effects: When pumpkin plants (variety: "Heiankogiku"), which had been cultivated in flower pots of 12 cm. in diameter, reached the 3- to 4-leaves stage, to the plants was sprayed at a rate of 10 ml. per pot, an aqueous 1,000 p.p.m. dilution of each of test compounds in the form of wettable powders. After 1 day, the plants were sprayed to be inoculated with a spore-suspension of powdery mildew fungus (*Sphaerotheca fuliginea*). 10 days thereafter, the diseased state of the upper four leaves was observed, and the degree of damage of the leaves was calculated from the area of diseased spots or colonies generated. The results obtained were as shown in Table 5. As is clear from Table 5, the present compound displayed far more excellent controlling effects than the control known compounds.

The degree of damage was calculated according to the following equation:

Degree of damage (%)
$$= \frac{(\text{Disease index} \times \text{number of leaves})}{\text{Number of investigated leaves} \times 5} \times 100$$

Disease Index:
 0—Not damaged
 1—Slightly damaged
 3—Considerably damaged
 5—Heavily damaged

TABLE 5

| | Active ingredient concentration (p.p.m.) | Degree of damage (percent) |
|---|---|---|
| Compound number: | | |
| (1) | 1,000 | 2.6 |
| (4) | 1,000 | 1.3 |
| (6) | 1,000 | 3.4 |
| (8) | 1,000 | 2.7 |
| (12) | 1,000 | 1.5 |
| (14) | 1,000 | 1.8 |
| (17) | 1,000 | 2.4 |
| (18) | 1,000 | 1.5 |
| (19) | 1,000 | 1.0 |
| (20) | 1,000 | 0.9 |
| Known compound: | | |
| (a) | 1,000 | 42.7 |
| (c) | 1,000 | 38.5 |
| (d) | 1,000 | 55.6 |
| (e) | 1,000 | 50.3 |
| (f) | 1,000 | 41.2 |
| Non-spraying | | 56.3 |

TEST EXAMPLE 5

Powdery-mildew-of-cucurbits-controlling effects: To the cotyledons of cucumber seedling (variety: "Kaga-aonaga-fushinari"), which had been cultivated in flower pots of 9 cm. in diameter, was sprayed at a rate of 10 ml. per pot, each solution of test compounds in the form of emulsifiable concentrates. After 24 hours from the spraying, the cotyledons were sprayed to be inoculated with a spore-suspension of powdery mildew fungus (*Sphaerotheca fuliginea*). 10 days thereafter, the diseased state of the cotyledons was observed, and the degree of damage of the cotyledon was calculated from the area of diseased spots or colonies generated. The results obtained were as shown in Table 6. As is clear from Table 6, the present compounds displayed more excellent controlling effects than the control known compounds.

The degree of damage was calculated according to such an equation as in Example 4.

fungus (*Pellicularia sasakii*), which had been cultured, was attached to be inoculated to sheaths of rice plants. 8 days thereafter, the length of diseased spots generated on the leaf sheaths was measured to investigate the controlling effects of individual compounds. The results obtained were as shown in Table 7. As is clear from Table 7, the present compounds were markedly excellent in effectiveness as compared with the known compounds.

TABLE 7

|  | Active ingredient concentration (p.p.m.) | Number of investigated stems | Average length of spots (cm.) |
|---|---|---|---|
| Compound number: |  |  |  |
| (21) | 1,000 | 16 | 4.9 |
| (22) | 1,000 | 16 | 3.1 |
| (24) | 1,000 | 16 | 2.3 |
| (26) | 1,000 | 16 | 2.4 |
| Known compound: |  |  |  |
| (a) | 1,000 | 16 | 8.7 |
| (f) | 1,000 | 16 | 10.3 |
| Non-treatment |  | 16 | 13.8 |

TABLE 6

|  | Active ingredient concentration (p.p.m.) | Number of investigated seed leaves | Degree of damage |
|---|---|---|---|
| Compound number: |  |  |  |
| (21) | 1,000 | 24 | 11.7 |
| (22) | 1,000 | 24 | 9.1 |
| (23) | 1,000 | 24 | 10.3 |
| (24) | 1,000 | 24 | 6.5 |
| (25) | 1,000 | 24 | 8.0 |
| (26) | 1,000 | 24 | 6.2 |
| (28) | 1,000 | 60 | 12.8 |
| (29) | 1,000 | 60 | 9.7 |
| (30) | 1,000 | 30 | 6.3 |
| (31) | 1,000 | 30 | 4.4 |
| (present compound) [2,6-dichlorophenyl structure with $S-CH_2COOC_2H_5$] | 1,000 | 60 | 7.0 |
| Known compound: |  |  |  |
| (a) | 1,000 | 30 | 34.7 |
| (b) | 1,000 | 24 | 71.4 |
| (c) | 1,000 | 24 | 60.1 |
| (d) | 1,000 | 24 | 44.0 |
| (e) | 1,000 | 24 | 69.2 |
| (f) | 1,000 | 30 | 48.1 |
| (known compound) [di-tolyl structure with $S-$p-tolyl] | 1,000 | 60 | 45.7 |
| Non-treatment |  | 30 | 71.8 |

TEST EXAMPLE 6

Sheath-blight-of-rice-controlling effects: To rice plants (variety: "Kinmaze"), which had been cultivated to 50–60 cm. in height in flower pots of 9 cm. in diameter, was sprayed at a rate of 16.6 ml. per pot, a solution of each test compound in the form of an emulsifiable concentrate. After 4 hours, a mycelial-disk-inoculum of sheath blight

TEST EXAMPLE 7

Antimicrobial spectrum test: According to the agar medium dilution method, the growth inhibitory effects of the present compounds against various plant pathogenic fungi and bacteria, *Aspergillus niger*, which is a kind of industrial molds propagating in industrial products, were investigated to obtain the results set forth in Tables 8, 9 and 10.

TABLE 8

| Examined micro-organism | Cm | Ak | Pa | Fp | Cr | Bc | Ss | Gc |
|---|---|---|---|---|---|---|---|---|
| Compound number: |  |  |  |  |  |  |  |  |
| (5) | 200-10 | 200-10 | 200-10 | 10> | 200-10 | — | 200 | — |
| (10) | — | 200 | 200-10 | 10> | 200-10 | — | 200-10 | — |

Note.—10>=This indicates that the compound was effective at 10 p.p.m., and no test was carried out at lower concentrations; —=Untested.

TABLE 9

| Examined micro-organism | Cm | Ak | Pa | Fp | Cr | Bc | Ss | Gc | Xo | An |
|---|---|---|---|---|---|---|---|---|---|---|
| Compound number: | | | | | | | | | | |
| (21) | B | D | C | C | — | — | B | — | B | B |
| (22) | A | B | A | C | C | C | A | A | A | A |
| (23) | B | C | B | — | D | D | B | D | C | B |
| (24) | A | C | A | B | — | C | A | B | A | A |
| (25) | B | C | B | D | — | C | A | D | C | C |
| (26) | B | D | B | B | C | — | A | B | A | B |

NOTE.—A=At a concentration of 100 p.p.m., the growth of microorganism was completely inhibited; B=At a concentration of 100 p.p.m., the growth of microorganism was inhibited to below 5% less than in the case of non-treatment; C=At a concentration of 100 p.p.m., the growth of microorganism was inhibited to below 10% less than in the case of non-treatment; D=At a concentration of 100 p.p.m., the growth of microorganism was inhibited to below 20% less than in the case of non-treatment; —= Untested.

TABLE 10

| Examined micro-organism | Cm | Ak | Pa | Fp | Cr | Bc | Ss | Gc | An |
|---|---|---|---|---|---|---|---|---|---|
| Compound number: | | | | | | | | | |
| (30) | B | A | A | A | B | B | A | B | A |
| (31) | A | C | — | A | B | C | B | B | B |
| (32) | — | C | C | B | A | B | B | C | B |
| (34) | A | B | B | A | — | B | A | C | C |
| (35) | B | B | — | B | C | C | A | B | — |
| (37) | B | A | — | B | — | D | A | C | — |

NOTE.—A=At a concentration of 50 p.p.m., the growth of microorganism was completely inhibited; B=At a concentration of 50 p.p.m., the growth of microorganism was inhibited to below 5% less than in the case of non-treatment; C=At a concentration of 50 p.p.m., the growth of microorganism was inhibited to below 10% less than in the case of non-treatment; D=At a concentration of 50 p.p.m., the growth of microorganism was inhibited to below 20% less than in the case of non-treatment; —= Untested.

The abbreviations set forth in Tables 8, 9 and 10 represent the following microorganisms:

Cm: *Cochliobolus miyabeanus*
Ak: *Alternaria kikuchiana*
Pa: *Pythium aphanidermatum*
Fp: *Fusarium solani f. pisi.*
Cr: *Corticium rolfsii*
Bc: *Botrytis cinerea*
Ss: *Sclerotinia sclerotiorum*
Gc: *Glomerella cingulata*
Xo: *Xanthomonas oryzae*
An: *Aspergillus niger* ATCC 9642

Table 11 shows the results obtained by investigating in the same manner as above the growth inhibitory effects of the present compounds on *Xanthomonas oryzae* (active ingredient concentrations: p.p.m.).

TABLE 11

| Compound No.: | *Xanthomonas oryzae* (examined bacterium) |
|---|---|
| (4) | 200–10 |
| (5) | 10> |
| (9) | 10> |
| (10) | 10> |
| (11) | 10> |
| (12) | 200–10 |
| (13) | 200–10 |

Table 12 shows the results obtained by investigating in the same manner as above the growth inhibitory effects of the present compounds on *Aspergillus niger* which propagates in industrial products, etc. (active ingredient concentration: p.p.m.).

TABLE 12

| Compound No.: | *Aspergillus niger* ATCC 9642 (examined fungus) |
|---|---|
| (5) | 1,000 |
| (10) | 1,000 |
| (11) | 1,000 |
| (13) | 1,000–50 |

Note.—1,000: This indicates that the compound was effective at 1,000 p.p.m., and no test was carried out at lower concentrations.

What is claimed is:

1. An N-phenylsuccinimide derivative represented by the formula,

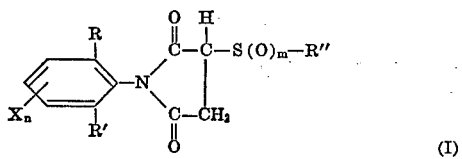

(I)

wherein R and R' are individually halogen or a lower alkyl having 1 to 3 carbon atoms; X is halogen, methyl, methoxy or nitro; R" is an alkyl having 1 to 10 carbon atoms, an alkenyl having 3 carbon atoms, a group of the formula,

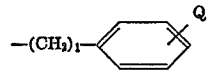

wherein Q is hydrogen, halogen, methyl, methoxy or nitro, and $l$ is 1, 2, 3 or 4, a group of the formula,

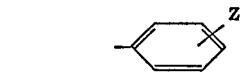

wherein Z is hydrogen, halogen, methyl, methoxy or nitro, α-furfuryl, or a group of the formula,

—CH$_2$COOR''' wherein R''' is methyl or ethyl; $n$ is 0, 1, 2 or 3; and $m$ is 0, 1 or 2.

2. An N-phenylsuccinimide derivative represented by the formula,

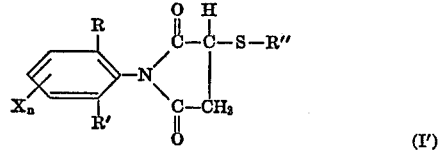

(I')

wherein X, R, R', R" and $n$ are as defined in claim 1.

3. An N-phenylsuccinimide derivative represented by the formula,

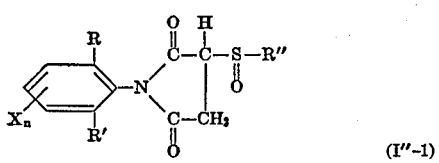

(I''-1)

wherein R, R', X, R'' and n are as defined in claim 1.

4. An N-phenylsuccinimide derivative represented by the formula,

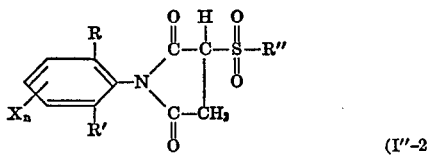

(I''-2)

wherein R, X, R', R'' and n are as defined in claim 1.

5. An N-phenylsuccinimide derivative according to claim 1, wherein R'' in the Formula I is α-furfuryl or a group of the formula,

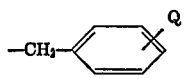

wherein Q is as defined in claim 1.

6. An N-phenylsuccinimide derivative according to claim 1, wherein R'' in the Formula I is an alkyl having 1 to 10 carbon atoms, or an alkenyl having 3 carbon atoms, a group of the formula,

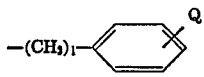

wherein Q and l are as defined in claim 1, or a group of the formula,

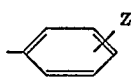

wherein Z is as defined in claim 1; and m in the Formula I is 0 or 1.

7. An N-phenylsuccinimide derivative according to claim 4, wherein R'' in the Formula I''-2 is an alkyl having 1 to 10 carbon atoms, an alkenyl having 3 carbon atoms, a group of the formula,

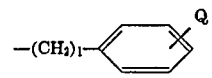

wherein Q and l are as defined in claim 1, a group of the formula,

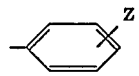

wherein Z is as defined in claim 1 or α-furfuryl.

8. An N-phenylsuccinimide derivative according to claim 1, wherein R'' in the Formula I is a group of the formula, —CH$_2$COOR''', wherein R''' is as defined in claim 1.

9.

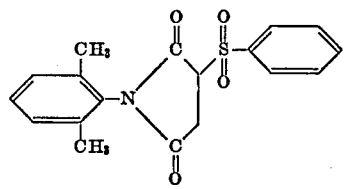

References Cited
UNITED STATES PATENTS 3,574,194   4/1971   Pfirrmann _____ 260—239.6

JOSEPH A. NARCAVAGE, Primary Examiner

U.S. Cl. X.R.

260—326.5 S, 326.5 SF, 516; 424—274